US011318759B2

(12) United States Patent
Golob et al.

(10) Patent No.: US 11,318,759 B2
(45) Date of Patent: May 3, 2022

(54) PRINT REGION BASED PRINT DRYING

(71) Applicant: HEWLETT-PACKARD DEVELOPMENT COMPANY, L.P., Spring, TX (US)

(72) Inventors: Lorraine T Golob, Vancouver, WA (US); Steve Rohman, Vancouver, WA (US); Milan Justel, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/499,914

(22) PCT Filed: Jun. 12, 2018

(86) PCT No.: PCT/US2018/037113
§ 371 (c)(1),
(2) Date: Oct. 1, 2019

(87) PCT Pub. No.: WO2019/240775
PCT Pub. Date: Dec. 19, 2019

(65) Prior Publication Data
US 2021/0402801 A1 Dec. 30, 2021

(51) Int. Cl.
*B41J 11/00* (2006.01)
(52) U.S. Cl.
CPC .................. *B41J 11/002* (2013.01)
(58) Field of Classification Search
CPC ...................................... B41J 11/002
See application file for complete search history.

(56) References Cited

U.S. PATENT DOCUMENTS

| | | | |
|---|---|---|---|
| 7,515,267 | B2 | 4/2009 | Ehbets |
| 8,854,689 | B2 | 10/2014 | Faber et al. |
| 8,985,756 | B2 | 3/2015 | Boland et al. |
| 9,250,595 | B1 | 2/2016 | Sreekumar et al. |
| 9,460,375 | B2 | 10/2016 | Bayona et al. |

(Continued)

FOREIGN PATENT DOCUMENTS

| | | | |
|---|---|---|---|
| JP | 2002113853 A | * | 4/2002 |
| JP | 2002113853 A | | 4/2002 |
| WO | WO2017099804 A1 | | 6/2017 |

*Primary Examiner* — Bradley W Thies
(74) *Attorney, Agent, or Firm* — Brooks Cameron & Huebsch PLLC

(57) ABSTRACT

Some examples include a print system including a memory to store instructions and print data of a print job, a processor to execute the instructions in the memory to reference print data of a print job, transform the print data into a plurality of print regions of a medium representation, each of the plurality of print regions including a print density, determine the quantity of print regions having a print density exceeding a predetermined threshold, and apply a modifier to the quantity of print regions having a print density exceeding the predetermined threshold to generate a score. The print system includes a print engine to move the medium along the print path to deposit a print substance onto a medium and apply drying to the medium and a controller to control a drying of the medium along the print path of the print engine in response to the score.

20 Claims, 5 Drawing Sheets

(56) References Cited

U.S. PATENT DOCUMENTS

| | | | |
|---|---|---|---|
| 2012/0243012 A1* | 9/2012 | Kakutani | H04N 1/4092 |
| | | | 358/1.9 |
| 2013/0162705 A1 | 6/2013 | Tombs et al. | |
| 2015/0220824 A1 | 8/2015 | Kikuta | |
| 2018/0050548 A1 | 2/2018 | Irurueta et al. | |

* cited by examiner

PRINT REGION BASED PRINT DRYING

BACKGROUND

Imaging systems, such as printers, copiers, etc., may be used to form markings on a physical medium, such as text, images, etc. An imaging system can perform two-dimensional or three-dimensional printing operations. In some examples, imaging systems may form markings on the physical medium by performing a print job. A print job can include forming markings such as text and/or images by transferring a print substance (e.g., ink, toner, etc.) to the physical medium. Imaging device, such as printers, include a print path where printing operations are performed.

DETAILED DESCRIPTION

Figure 1:
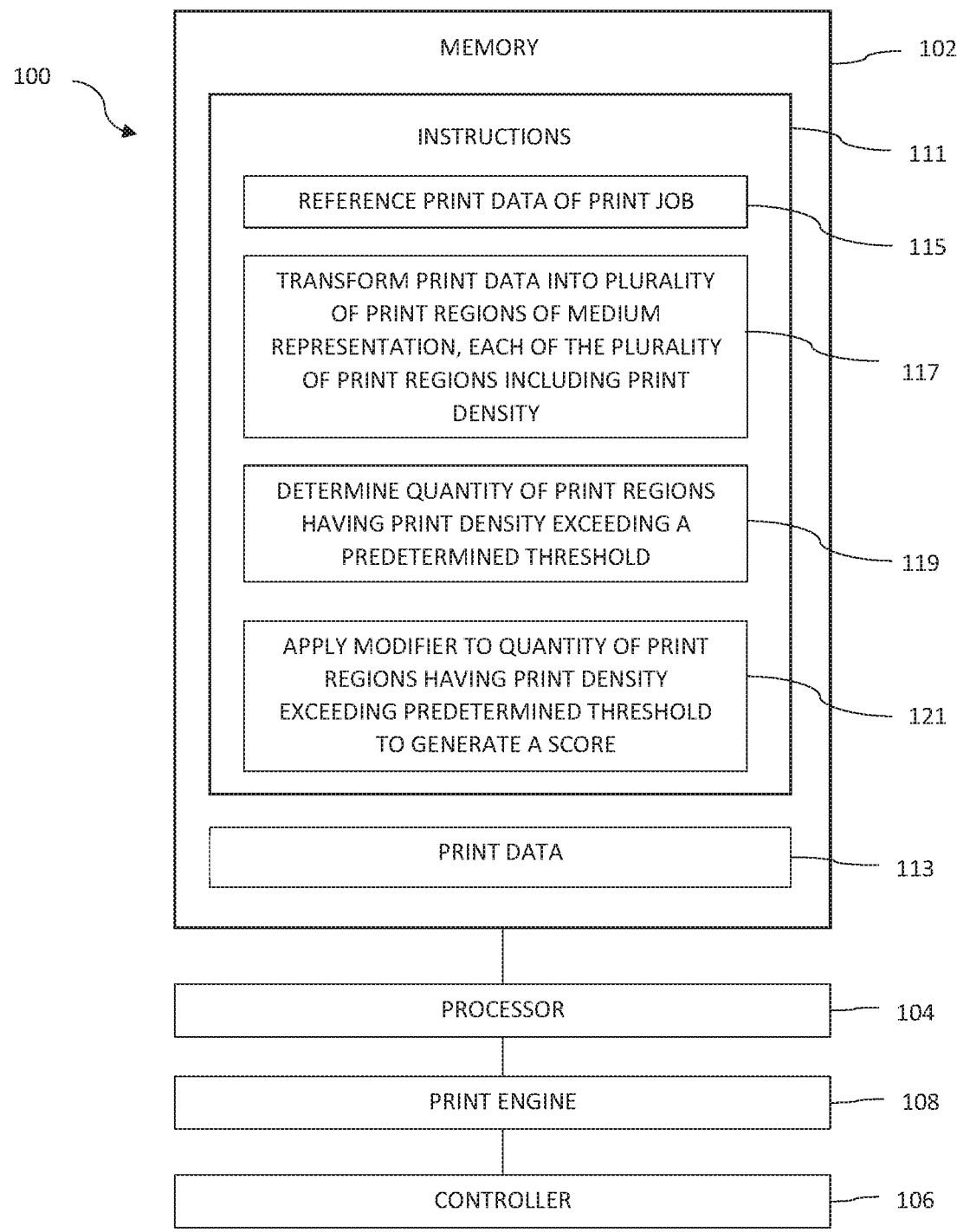
FIG. 1 is a block diagram of an example imaging system in accordance with aspects of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In general, imaging devices can create physical representations, patterns, or images by depositing a print substance on a print medium in a desired pattern. Imaging devices can deposit the print substance onto the physical medium during an imaging or printing process. The image device can include any hardware device with functionalities to physically produce representation(s) (e.g., text, images, models, etc.) on the medium. The medium can include various types of print media, such as paper, photopolymers, plastics, composite, and can include any suitable object or materials to which a print substance from a printing device can be applied including materials such as powdered build materials for forming three-dimensional articles. Print substances such as printing agents, marking agents, and colorants, can include toner, liquid inks, or other suitable marking materials that may or may not be mixed with fusing agents, detailing agents, or other materials and can be applied to the medium. In some examples, the imaging devices, such as inkjet printers, deposit a liquid print substance that is ejectable from a print head, such as ink, toner, binding agent, or the like. Many liquid print substances (e.g., inks) are water-based.

In some examples, imaging devices deposit quantities of the printing substance onto the printable medium based on job attributes of a print job. A job attribute represents a characteristic of a print job. Some example job attributes include print settings, user interface (UI) settings, a print substance type, a media type, a page size, a page orientation, a content class, a number of pages, a number of copies, a simplex or duplex job option, a grayscale or color option, a stapling option, a hole punching option, a booklet making option, and the like.

Depending on the quantity of the printing substance deposited, a medium that is subject to a quantity of print substance to make the medium "wet" can move through the print path differently than medium that is subject to a lesser quantity of print substance. The effect of the print substance on the medium can be influenced by the print substance density in an area, the location of the dispensed print substance on the medium, and the size of the area of the dispensed print substance on the medium and the type of medium, for example. In some examples, a number of physical properties of the printable medium can be changed when the printing substance deposited by the imaging device are not completely dry. In some examples, a liquid state of printing substance can cause distorted properties in the medium. For example, wetting print media with large quantities of print substance can cause the media to swell, distort, buckle, and/or curl. Partially dried printed media can have distorted properties such as curl, cockle, reduction in stiffness, increased surface roughness, extruded surface fibers, misaligned fibers, and increased sheet to sheet friction of the media. Printed media that is not completely dry can provide difficulties when stacking and/or aligning for finishing operations such as stapling or hole punching.

In some examples, the imaging system can determine and set dry time (e.g., time it takes to print one page or delay before beginning to print next page) depending on the print content. Generally, dry time is the time that ink on a media has to substantially dry in order that any later manipulations will not cause image quality defects (e.g., ink smears) or finishing defects (e.g., unaligned stapled pages) in the finished print job. Further, the medium stiffness can be maintained and medium-to-medium friction can be reduced to improve reliability in handling and finishing with appropriate dry time.

A print content page can include areas, or regions, of high print density that can affect the time to achieve substantial dryness. The print fluid density of each region considered in dynamically compensating or otherwise adjusting the operation of the print device, such as adjusting the movement and speed of a page along the print path. By considering the print fluid density at a region, proper adjustments can be made in an individualize manner for each page. For example, a single small densely printed region of a print page can indicate a slowing a speed of the page along the print path differently than several large densely printed regions throughout the print page.

Lowering, or decreasing, the speed of the media along a print path of the imaging system can allow for additional dry time to more fully, or completely, dry the printed medium and provide printed media that is easier to compile or otherwise manipulate. Modifying the print process speed along the print path modifies the dry time by exposing the media to drying mechanisms for longer periods of time when the print speed is decreased, for example. Large regions of print substance can use increased dry time, thus, further lowering the speed along the print path. In other examples, drying of the printed media can be adjusted by increasing the printer's dryer temperature, increasing a fan speed, or increasing a heated pressure roller temperature. In some examples, more than one of the adjustments to the print process can be used to increase drying of the printed media. The print dry processing, regulation, and management can be performed on a per page basis.

The print operations can be adjusted to address the density of the print substance application onto regions of the medium. The operations of the imaging device can be adjusted based on print content, or print job data, including the print density of the print fluid to be deposited on the medium during a print job, for example. The print process can proceed along the print path at a speed appropriate to permit the print substance to dry prior to output of the medium to a finisher, for example. Adjustments to the operations can be selectively made on a page by page, or sheet by sheet, basis based on the print content in order to add drying to those printed media to which additional drying would be useful to improve finished attributes of the printed medium.

Numerous variables ultimately affect the drying of a medium such as area coverage of print substance, mass of print substance, thickness of the medium, composition of the medium, print substance composition, and environmental conditions such as temperatures and humidity. One or several of the numerous variables can be included in determinations of print drying. For example, the density or mass distribution of the print substance to be deposited on the medium can be mapped and transformed into weighted values representing the print substance to be dispensed across the medium in order to selectively increase drying time of the medium. In some examples, the examples of the present disclosure can be used as an extension of, or added to, the weighted values representing the print substance used by the imaging system to further selectively adjust drying time of the media. The examples of the present disclosure can further selectively increase drying time of the media in the imaging system based on print density threshold determinations of the print regions.

FIG. 1 is a block diagram of an imaging system 100 in accordance with aspects of the present disclosure. In one example, the imaging system 100 is an inkjet printing system or other suitable printing system that generates printed media to be dried. The imaging system 100 includes a memory 102, a processor 104, a controller 106, and a print engine 108. The memory 102 can store instructions 111 and print content, or print data, 113 of a print job. The memory 102 can store computer executable instructions to be processed, or executed, by the processor 104. The memory 102 can store data, programs, instructions, or any other machine readable data that can be utilized to operate the imaging system 100. The instructions 111 can include a set of instructions 115-121. Instruction 115 is to reference print data 115 of the print job. Instruction 117 is to transform the print data into a plurality of print regions of a medium representation, each of the plurality of print regions including a print density. Instruction 119 is to determine the quantity of print regions having a print density exceeding a predetermined threshold. Instruction 121 is to apply a modifier to the quantity of print regions having a print density exceeding the predetermined threshold to generate a score.

The processor 104 can access the memory 102 and execute the computer executable instructions 111. The processor 104 can be a computing device and can include an application-specific integrated circuit (ASIC), among other things. The processor 104 can execute a set of instructions (e.g., instructions 111) to implement the operations of the examples included herein. The controller 106 can include a combination of hardware and programming. The controller 106 is operably couple to the print engine 108 to control operations of the print process. For example, the controller 106 can receive signals, such as electrical, optical, or mechanical signals, representative of a digital image to be transformed in a printed medium image. The controller 106 can be operably coupled the processor 104 and the memory 102 to set print parameters of the print engine 108 based on the print content of the image to be printed. The print engine 108 include mechanisms and logic to print or mark images on media.

Figure 2:
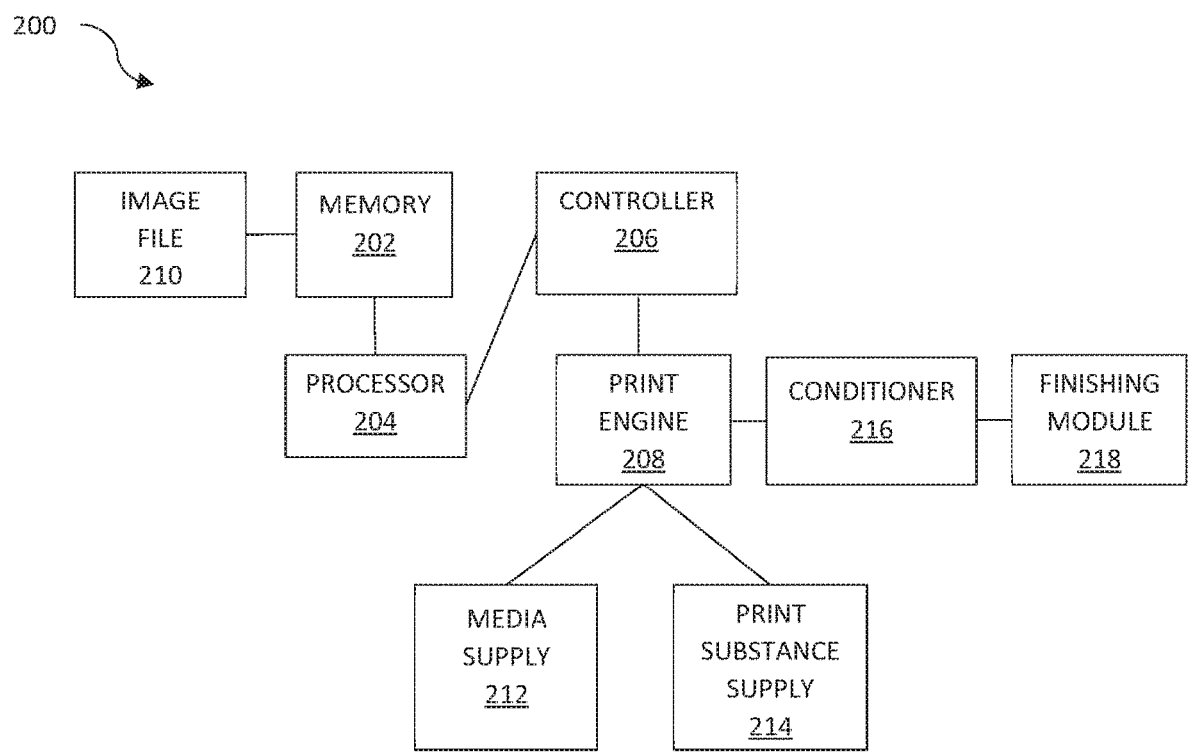
FIG. 2 is a block diagram of an example imaging system in accordance with aspects of the present disclosure.

FIG. 2 is a block diagram of another example imaging system 200 in accordance with aspects of the present disclosure. Aspects of the imaging system 200 are similar to those of imaging system 100 described above. The imaging system 200 can include a memory 202, a processor 204, a controller 206, and a print engine 208. The imaging system 200 can receive an image file 210 including digital print content data of a print job. A media supply 212 can provide a selected medium to the print engine 208 on which the images (based print data of the image file 210) can be printed or marked. The print engine 208 is coupled to a consumable print substance supply 214 which can be used to print or mark the medium based on the received print data. An example of the print engine 208 can include an inkjet print engine that can apply a liquid print substance to a medium. The print engine 208 can deliver the print substance to the medium via a print head proximate to the medium. The printed media can be fed, or moved along a print path, including through or past a conditioner 216 (e.g., drying mechanism). The print path can terminate at a finishing module 218 that can be included with the imaging system 200. The finishing module 218 can cut, collate, stack, staple, or otherwise provide the printed media in a finished form.

Figure 3A:
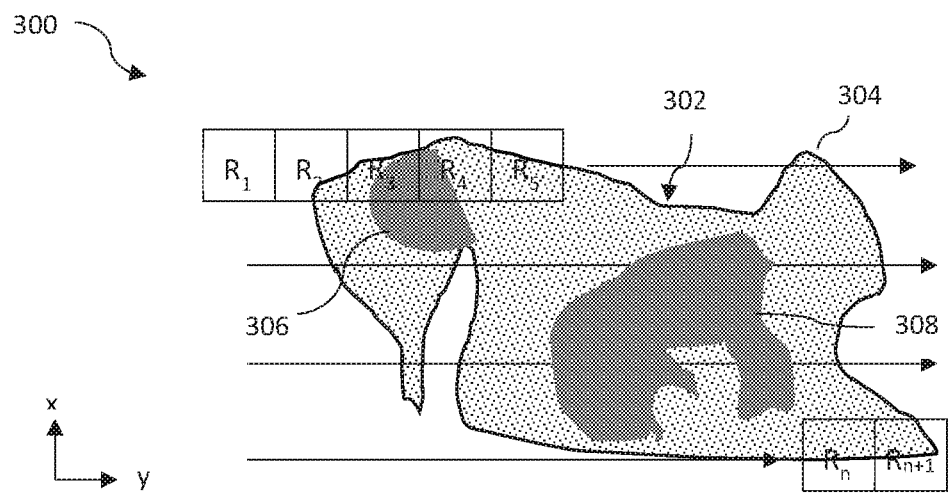
FIG. 3A is an example representation of a digital image to be printed on a medium in accordance with aspects of the present disclosure.

FIG. 3A is an example representation 300 of a digital image 302 to be printed on a medium. The representation 300 can be defined into a plurality of print regions $R_1 \ldots R_{n+1}$ representing a plane of the medium. The plurality of print regions $R_1 \ldots R_{n+1}$ can be mapped as a non-overlapping sequence of adjacently disposed regions (partially illustrated) along an x-axis and a y-axis of the planar represented medium. In one example, each of the plurality of print regions $R_1 \ldots R_{n+1}$ of the represented medium are all the same size. The plane can be divided into a plurality of regions $R_1 \ldots R_{n+1}$ whereby each region comprises a number of pixels (or voxels). For example, the represented medium can be divided into regions $R_1 \ldots R_{n+1}$ that are each 300ths of an inch×300ths of an inch square. The size of the print regions can be predetermined. In one example, the size of the print regions can be different for different types of print jobs. The digital image 302 can be mapped to the plurality of regions $R_1 \ldots R_{n+1}$ to receive print substance on a plane of the medium representation based on the print content of the print job. The print substance to be printed can be represented by representing the plane with features (e.g., image features 304, 306, 308) of print substance on the plane, such as a representation of the quantity of print substance to be deposited on each of the plurality of regions $R_1 \ldots R_{n+1}$ of the plane. The digital image 302 can include varying print densities. In one example, image features 306, 308 can have a first print density and image feature 304 can have a second print density with the first print density greater than the second print density. Only two print densities are included for simplicity of illustration. Additional image features and other print densities, including graduated print densities, can also be included.

Figure 3B:
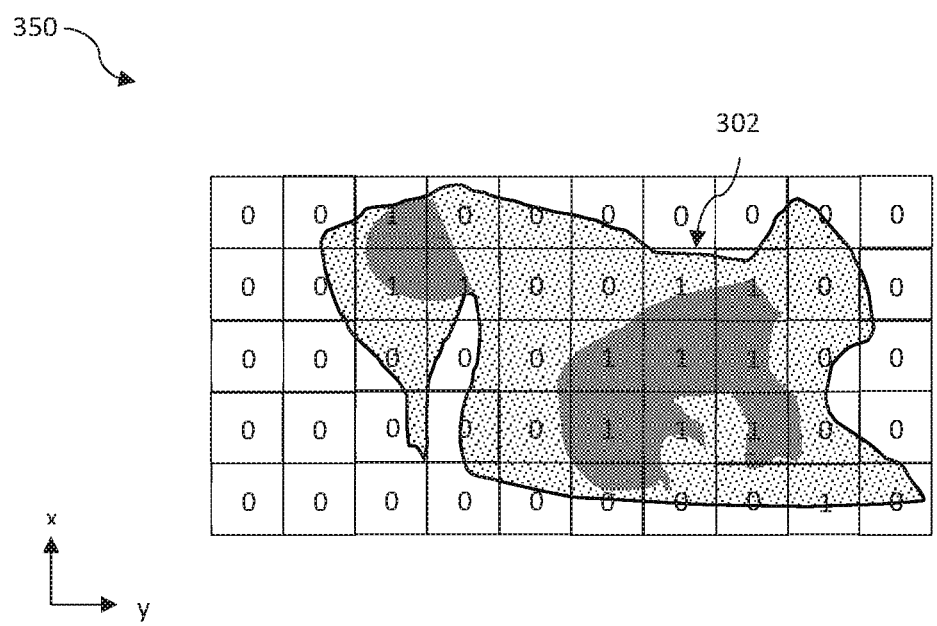
FIG. 3B is an example representation print threshold classifications of the digital image of FIG. 3A in accordance with aspects of the present disclosure.

FIG. 3B shows an example representation 350 illustrating print density threshold classifications of the digital image 302 of FIG. 3A in accordance with aspects of the present disclosure. Each of the plurality of regions $R_1 \ldots R_{n+1}$ of the medium representation 300 of FIG. 3A including the digital image 302 can be characterized by a print density threshold classification (e.g., in this case a binary 0 or 1). In one example, a print density threshold of the print substance can be predefined and applied to, or compared to, a print density of each of the plurality of print regions. In one example, the print density threshold may be represented in terms of a volume, mass, or density of print substance applied within a print region. The print substance may "wet" the medium above a predetermined, or threshold saturation or ink limit (e.g., mg/300ths) level, thereby being above the print density threshold. The print density of a print region can be digitally determined, or measured, based on the print content of the digital image. A print region can be determined to have a print density that exceeds the print density threshold or can be determined to have a print density that does not exceed the print density threshold based on the percentage of area and/or overall print density of the print region. In some examples, a portion of a print region exceeds the density threshold and a determination for the entire print region can be determined to exceed or not exceed the print density threshold. Each determination is assigned a print density threshold classification. For example, each of the plurality of print regions not exceeding the print density threshold can be classified, or scored, as "0" and each of the plurality of print regions exceeding the density threshold can be classified, or scored, as "1".

Once classified, the number of instances of the plurality of print regions exceeding the print density threshold can be added together. The scored values (e.g., 0, 1) can be accumulated across the entirety of the plurality of print regions of the medium representation. In one example, the higher the accumulated score, the more drying time is increased. The accumulated score can be adjusted by a weighted modifier to obtain a modified score. The weighted modifier can be adjusted and/or selected based on the media type, size of the print regions, environment (e.g., humidity, temperature), finishing (e.g., stapled, unstapled), or plexity (e.g., simplex, duplex). The modified score can be a drying "penalty" that is applied to the print process to slow or decrease the print process speed in order to increase drying time of the printed medium through the print path. In one example, the modified score does not increase the drying time. A score can be independently generated for each medium, for example, each sheet of sheet media.

Additional determinations can be included. In one example, each of classifications of the plurality of print regions can be recorded, or tracked. In one example, the proximity of each of the plurality of the print regions exceeding the print density threshold of print substance can be determined and included in the technique to adjust drying time. In one example, the print density threshold is the same, or constant, throughout the plurality of print regions. In another example, the density threshold can be varied across the plurality of print regions. For example, the density threshold can be lower at the print regions along a perimeter of the represented medium than the print regions in a center of the represented medium.

Adjustments to the print drying can be determined prior to printing to selectively increase drying. The technique of the present disclosure can be used to adjust the print drying process before the print fluid is dispensed onto the medium. In one example, a decreased transport speed of the medium past the dryer, for example, can allow for more drying of the printed medium due to a longer dwell time of the medium in the conditioner or drying assembly. In other examples, drying of the printed media can be adjusted by increasing the printer's dryer temperature, increasing a fan speed, or increasing a heated pressure roller temperature. In some examples, more than one of the adjustments to the print process can be used to increase drying of the printed media. Adjustments to the print process speed can be employed at the conditioner, at the finisher, or at any or all portions of the print path.

The density threshold determinations can be used in monitoring and regulating a print process in an imaging system, for example, in a sheet-fed ink based laser jet imaging systems. The technique can be used to select proper drying parameters based on the determined number, or instances, of print regions and/or grouping of print regions above the threshold value. The additional drying can improve finishing with improved compiling and media stack alignment and neatness.

Figure 4:
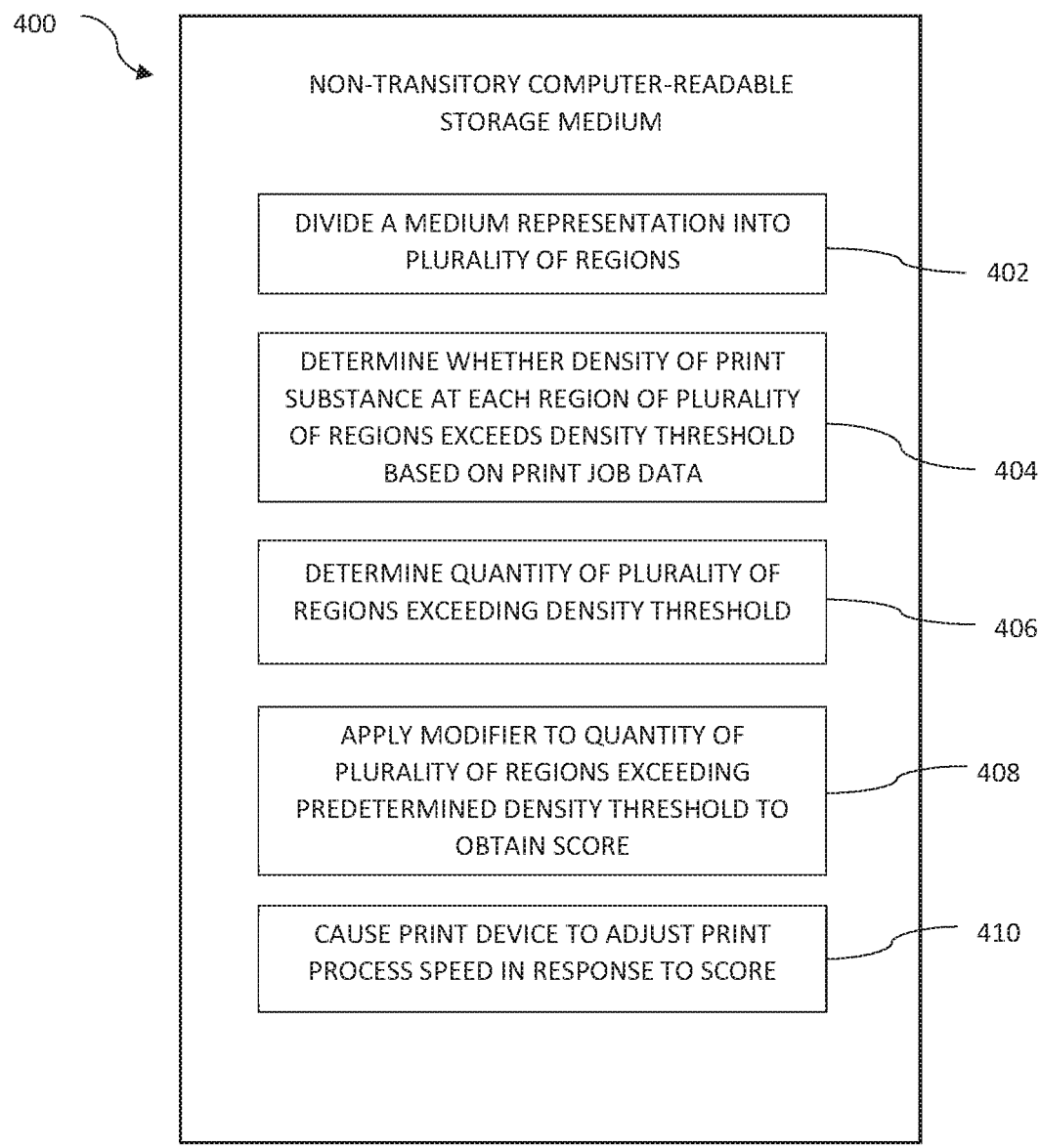
FIG. 4 is an example non-transitory computer-readable storage medium in accordance with aspects of the present disclosure.

FIG. 4 is an example non-transitory computer-readable storage medium 400 in accordance with aspects of the present disclosure. In one example, the non-transitory computer-readable storage medium 400 is included in the memory of the imaging system and includes a set of instructions 402-410 executable by the processor. Instruction 402 can divide a medium representation into a plurality of regions. Instruction 404 can determine whether an amount of print fluid to be dispensed at each region of the plurality of regions exceeds a density condition based on print job data. Instruction 406 can determine a quantity of the plurality of regions above the density condition. Instruction 408 can apply a modifier to the quantity of plurality of regions above the predetermined density condition to obtain a score. Instruction 410 can cause a print device to adjust print speed based on the score. In one example, the instructions of the non-transitory computer-readable storage medium can determine a concentration of adjacently disposed regions of the plurality of regions. In one example, the modifier can correspond to a medium form or type of medium (e.g., bonded paper, transparent sheet, etc.).

Figure 5:
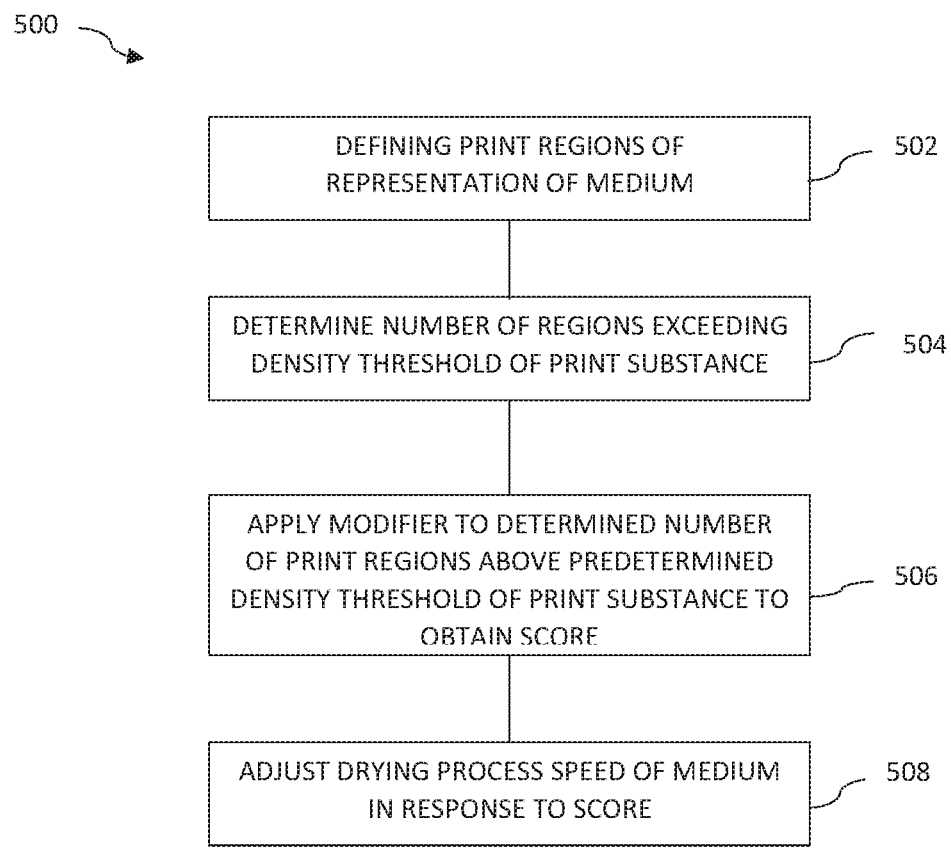
FIG. 5 is a flow chart of an example method of regulating a print process in accordance with aspects of the present disclosure.

FIG. 5 is a flow chart of an example method 500 of regulating a print process in accordance with aspects of the present disclosure. At 502, print regions of a representation of a medium are defined. At 504, a number of the print regions above a density threshold of print substance are determined. At 506, a predetermined modifier to the determined number of print regions above the density threshold of print substance to obtain a score is applied. At 508, a drying process of the medium is adjusted in response to the score.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A print system, comprising:
a memory to store instructions and print data of a print job;
a processor to execute the instructions in the memory to:
divide a planar medium representation into a plurality of print regions;
subsequent to division of the planar medium, reference print data of a print job;
transform the print data into weighted print density values representing an amount of the print substance to be dispensed in respective print regions of the plurality of print regions, each of the plurality of print regions including a respective weighted print density,
determine a quantity of print regions having a respective weighted print density exceeding a threshold,
determine a score based on the quantity of print regions having the respective weighted print density exceeding the threshold; and
apply a size modifier to the score to generate a modified score; wherein the size modifier is associated with a size of each of the plurality of print regions,
a print engine including a print path, the print engine to move the medium along the print path to deposit a print substance onto a medium based on the print data; and
a controller operably coupled to the processor and the print engine, the controller to control drying of the medium along the print path of the print engine in response to the modified score.

2. The system of claim 1, comprising:
a conditioner to condition a printed medium, a speed of the conditioner adjustable based on the score.

3. The system of claim 1, comprising:
a finisher to compile a printed medium, a speed of the finisher adjustable based on the modified score.

4. The system of claim 1, wherein the medium is one of a sheet media and the modified score is independently generated for each medium of the sheet media.

5. The system of claim 1, wherein the print engine includes a print head to deposit the print substance.

6. The system of claim 1, wherein the size modifier is adjustable based on a type of the medium.

7. The system of claim 1, wherein the print regions each are the same size, and wherein the size of the print regions is different for different types of print jobs.

8. A non-transitory computer-readable storage medium comprising a set of instructions executable by a processor to:
divide a planar medium representation into a plurality of print regions that form a non-overlapping sequence of adjacently disposed regions along an x-axis and a y-axis of the planar medium representation;
subsequent to division of the medium representation into the plurality of regions, determine whether a density of print substance at individual regions of the plurality of regions exceeds a density threshold based on print job data;
determine a quantity of the plurality of regions exceeding the density threshold;
determine a score based on the quantity of print regions exceeding the print density threshold;
apply a size modifier to the score to obtain a modified score, wherein the size modifier is associated with a size of each of the plurality of print regions; and
cause a print device to adjust a print process speed in response to the modified score.

9. The non-transitory computer-readable storage medium comprising a set of instructions executable by a processor of claim 8 to:
determine adjacently disposed regions of the plurality of regions exceeding the density threshold.

10. The non-transitory computer-readable storage medium comprising a set of instructions executable by a processor of claim 8, wherein the size modifier corresponds to a medium type.

11. The non-transitory computer-readable storage medium comprising a set of instructions executable by a processor of claim 8, wherein the print regions each are the same size, and wherein the size of the print regions are different for different types of print jobs.

12. The non-transitory computer-readable storage medium comprising a set of instructions executable by a processor of claim 8, wherein the density threshold is included in a plurality of respective density thresholds, and wherein a density threshold of the plurality of density thresholds is lower at a print region located along a perimeter of the represented medium than density threshold of a print region in a center of the represented medium.

13. The non-transitory computer-readable storage medium comprising a set of instructions executable by a processor of claim 8, wherein the size of each of the plurality of print regions is equal to a given quantity of pixels of voxels.

14. A method of regulating a print drying process, comprising:
dividing a planar medium representation into a plurality of print regions that form a non-overlapping sequence of adjacently disposed regions along an x-axis and a y-axis of the planar medium representation;
subsequent to dividing the planar medium representation into the plurality of print regions, determining a number of the print regions above a density threshold of print substance;
determining a score based on the quantity of print regions exceeding the print density threshold;
applying a predetermined size modifier to the score to obtain a modified score, wherein the size modifier is associated with a size of each of the plurality of print regions; and
adjusting a drying process of the medium in response to the modified score.

15. The method of claim 14, wherein adjusting the drying process includes decreasing a print process speed of the medium along a print path.

16. The method of claim 14, wherein the predetermined size modifier is associated with a type of medium.

17. The method of claim 14, comprising:
determining a proximity of each of the number of the print regions above the density threshold of print substance.

18. The method of claim 14, comprising:
determining a proximity of the print regions to one another above the density threshold of print substance, wherein the score includes is modified based on the determined proximity of the print regions.

19. The method of claim 14, wherein the size of the print regions are different for different types of print jobs.

20. The method of claim 14, wherein the density threshold is included in a plurality of respective density thresholds, and wherein a density threshold of the plurality of density thresholds is lower at a print region located along a perimeter of the represented medium than a density through of a print region in a center of the represented medium.

* * * * *